March 19, 1968    HANS-MARTIN WEITZ ETAL    3,374,263
SEPARATING ACRYLONITRILE OR METHACRYLONITRILE FROM
MIXTURES CONTAINING THE SAME
Filed Feb. 5, 1965
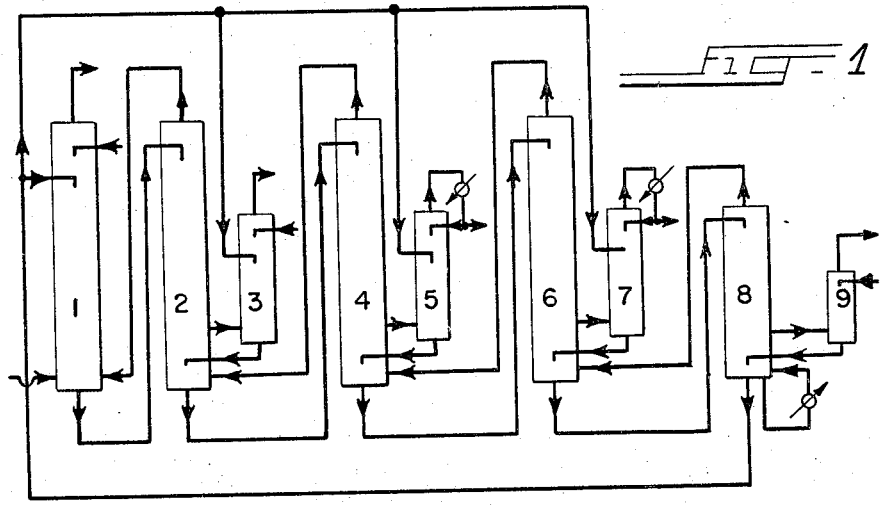
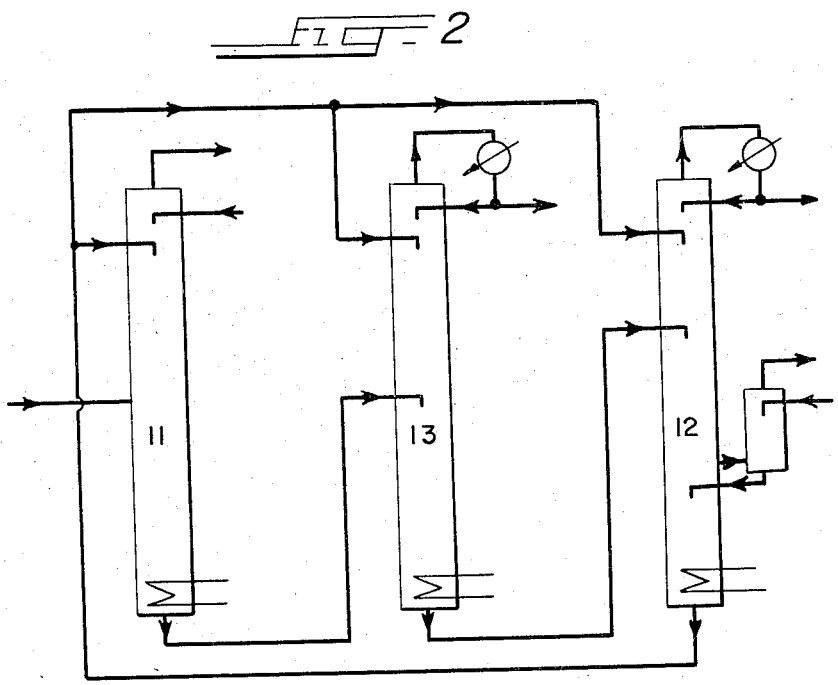
INVENTORS.
HANS-MARTIN WEITZ
HANS FRIZ
ROLF PLATZ United States Patent Office 3,374,263
Patented Mar. 19, 1968

3,374,263
SEPARATING ACRYLONITRILE OR METHACRY-
LONITRILE FROM MIXTURES CONTAINING
THE SAME
Hans-Martin Weitz and Hans Friz, Ludwigshafen (Rhine), and Rolf Platz, Mannheim, Germany, assignors to Badische Anilin- & Soda-Fabrik Aktiengesellschaft, Ludwigshafen (Rhine), Germany
Filed Feb. 5, 1965, Ser. No. 430,535
Claims priority, application Germany, Feb. 7, 1964,
B 75,330
8 Claims. (Cl. 260—465.3)

ABSTRACT OF THE DISCLOSURE

Separation of unsaturated nitriles, especially acrylonitrile and/or methacrylonitrile, from gas mixtures such as are obtained in the ammonia oxidation of olefins, especially of propylene and/or butylene, by countercurrently contacting such gas mixtures with lactones, lactams, N-alkyllactams, N-hydroxyalkyllactams, sulfones, sulfoxides or propylenecarbonate and recovering the dissolved unsaturated nitriles from the resultant solution.

---

This invention relates to the separation of acrylonitrile or methacrylonitrile from gases containing the same, particularly from those obtained in the ammonia oxidation (so-called) of propylene or isobutylene.

In the prior art method of producing acrylonitrile, for example by catalytic reaction of propylene or acrolein with oxygen and ammonia, a crude acrylonitrile is obtained which contains, as byproducts, acetonitrile, acrolein, hydrogen cyanide and in some cases acetocyanhydrin (lactic nitrile) and acetaldehyde. Acrylonitrile is difficult to isolate from the said mixture without great loss and moreover one or other component of the mixture usually cannot be recovered at all or can only be recovered in a form which is unsuitable for use. Many methods of distillation are already known by which such mixtures may be separated. Without exception they are very complicated and expensive methods. Extraction methods and methods which make use of extractive distillation have also been described for the said separating job. Water, higher alcohols, ethers, alkylnaphthalenes, or two-phase mixtures of polar and non-polar solvents have been used in these methods. All the prior art methods are unsatisfactory because either the solvent power of the extractive agent used is very low (i.e., very large amounts of solvent must be used), or the selectivity (i.e., the separating efficiency) is inadequate, or both.

It is an object of the present invention to provide a method for the extractive separation of gas mixtures containing acrylonitrile or methacrylonitrile by means of solvents which have not hitherto been used for this purpose. It is another object of the invention to provide a method for the extractive separation of gas mixtures containing acrylonitrile or methacrylonitrile which is simpler and more economical than the separation methods of the prior art. A further object of the invention is to provide a method for the extractive separation of gas mixtures containing acrylonitrile or methacrylonitrile which enables acrylonitrile and methacrylonitrile to be efficiently recovered and gives high yields of high-purity product.

These and other objects and advantages of the invention will be better understood from the following detailed description in conjunction with the accompanying drawings in which apparatus suitable for carrying out the process according to the invention are shown diagrammatically.

We have found that acrylonitrile or methacrylonitrile, i.e., $\alpha,\beta$-olefinically unsaturated nitriles having three or four carbon atoms, can be separated from mixtures containing the same in an extractive countercurrent method by using as the extractive agent a five-membered or six-membered lactone, N-alkyllactam, or N-hydroxyalkyl-lactam, a sulfone of the formula R—SO$_2$—R' where R and R' each represent methyl or ethyl or, when joined together, form a butylene group which may bear an alkyl group with one to four carbon atoms as a substituent, or propylene carbonate.

The gas mixture used as initial materials may have, after having been dried, approximately the following composition:

| | Percent |
|---|---|
| Acrylonitrile or methacrylonitrile | 0.1 to 7 |
| Acrolein or methacrolein | 0 to 1 |
| Hydrogen cyanide | 0 to 2 |
| Acetonitrile | 0 to 2 |
| Propionitrile | 0 to 1 |
| Acetaldehyde | 0 to 1 |
| Propylene and isobutylene | 0 to 5 |
| Other hydrocarbons (for example ethylene, propane, butanes and n-butenes) | 0 to 7 |
| Ammonia | 0 to 2 |
| Carbon monoxide | 0 to 5 |
| Carbon dioxide | 0 to 5 |
| Oxygen | 0 to 1 |
| Inert gases (for example dinitrogen monoxide) | 0 to 0.5 |

Nitrogen as the balance.

The process according to this invention is however not limited to gas mixtures having the above composition but may be used quite generally for gas mixtures which contain the said components in about the following limits. (All the percentages are by volume):

| | Percent |
|---|---|
| Acrylonitrile or methacrylonitrile | 0.1 to 15 |
| Acrolein or methacrolein | 0 to 15 |
| Hydrogen cyanide | 0 to 15 |
| Acetonitrile | 0 to 15 |
| Propionitrile | 0 to 15 |
| Acetaldehyde | 0 to 5 |
| Propylene and other hydrocarbons (for example isobutylene, ethylene, propane, butanes and n-butenes) | 0 to 15 |
| Ammonia | 0 to 15 |
| Carbon monoxide | 0 to 15 |
| Carbon dioxide | 0 to 15 |

Balance oxygen and inert gases, particularly nitrogen.

If the gas mixture to be separated contains a large amount of water vapor, for example more than 10% by volume, it is advantageous to separate the bulk of the water by cooling prior to the actual separation. If the water content is more than 5%, separation may also be advantageous. If the amount of acrylonitrile or methacrylonitrile contained in the condensate is to be recovered, the water obtained is used in one of the washing stages in the process. In some cases it may be advantageous to separate one or more of the components of the gas mixture by prior art methods, for example by removing only the ammonia by washing with an acid, by removing ammonia and hydrocyanic acid by washing with water, or by removing only the hydrocyanic acid by washing with an alkaline solution. It may be advantageous however to remove from the gas mixture substances which in the separation may give rise to disturbances, for example by forming resins, by introducing a pre-scrubbing stage. A small amount of the solvent used in the separation may be used for this purpose. The solvent from the pre-scrubbing stage may either be regenerated in a suitable way and then used again for the preliminary purification, or it may be favorable to supply the loaded solvent to the solvent cycle of the separation process at a suitable point. Another possibility is to use for the pre-scrubbing one of the abovementioned solvents other than that used in the separation process.

Examples of suitable extractive agents are: butyrolactone, dimethylsulfoxide, pyrrolidone, N-methylpyrrolidone, N-ethylpyrrolidone, N-isobutylpyrrolidone, N-hydroxyethylpyrrolidone, valerolactone, piperidone, N-methylpiperidone, N-ethylpiperidone, dimethylsulfone, diethylsulfone, tetramethylenesulfone, and 3-methyl-tetramethylenesulfone. The alkyl and hydroxyalkyl substituents of the lactams in general do not have more than 1 to 4 carbon atoms. The cyclic sulfones may be represented by the formula R—SO—R' where R and R' together stand for a bivalent saturated hydrocarbon radical having from 4 to 8 carbon atoms and in which the two free valencies are separated by 4 carbon atmos. N-methylpyrrolidone is preferred as the extractive agent.

The solvents may be used singly or mixed with each other or with small additions of water, for example up to 10% by weight. In some cases however a higher water content, for example up to 25% by weight, may be advantageous. As a rule the water content decreases the solvent power of the solvent for the organic compounds but increases selectivity.

The extraction process may be carried out at any temperature from the solidification temperature to the boiling point of the extractive agent, for example from —24° to 206° C. in the case of N-methylpyrrolidone. It is advantageous to use temperature ranges lying from 10° to 100° C., i.e., ranges which are conveniently controlled by cooling with river water. Usually the process is carried out at atmospheric pressure but subatmospheric pressure, for example 100 to 250 mm. Hg, or superatmospheric pressure, for example up to 10 atmospheres may be used. Lowering of the partial pressure of the components may also be achieved by blowing in gases or gas mixtures having only slight solubility in the solvent. Nitrogen and/or water vapor are suitable for this purpose, for example. It may also be advantageous (for example if the gas mixture of nitrogen, propylene and possibly ammonia which is obtained by the separation process is to be used again for the synthesis) to use for this process the substances used up in the synthesis, for example propylene or ammonia; this way the used-up substances are replenished at the same time. When using more than one gas, it may be advantageous to blow in the gases at different points in the separation plant.

The relative proportions of selective solvent and gas mixture (reckoned as dry) to be used should be adapted to the solvent and the particular separating job. They are also dependent on the temperature in the scrubber. For example when the main components to be washed out and separated are acrylonitrile, acetonitrile, acrolein and hydrocyanic acid, the following relative proportions are suitable at a temperature of 30° C. in the scrubber and a pressure of 1 atm. abs.

| Solvent: | Relative proportions: liters of solvent per cubic meter (S.T.P.) of gas |
|---|---|
| N-methylpyrrolidone | 0.5 to 5, particularly 1 to 4. |
| Butyrolactone | 1 to 6, particularly 2 to 5. |
| Tetramethylenesulfone | 2 to 8, particularly 2 to 6. |
| Propylene carbonate | 0.5 to 5, particularly 1 to 4. |

At a temperature of 50° C. in the scrubber, the amount of solvent required is about 2.5 times that required at 30° C. The remaining gas, when using the said relative proportions, consists mainly of nitrogen, oxygen, propylene and ammonia.

If only acrylonitrile is to be washed out from the gas mixture, the following amounts of solvent are required (at 30° C.).

| Solvent: | Liters of solvent per cubic meter (S.T.P.) of gas |
|---|---|
| N-methylpyrrolidone | 0.2 to 4, particularly 0.5 to 2. |
| Butyrolactone | 0.5 to 5, particularly 0.5 to 3. |
| Tetramethylenesulfone | 0.5 to 5, particularly 0.5 to 3. |
| Propylene carbonate | 0.2 to 4, particularly 0.5 to 2. |

The method according to this invention will now be described by way of example with reference to the accompanying drawing, FIGURE 1, for a countercurrent extraction of a current of gas with a solvent: The gas mixture to be separated, consisting for example of acrylonitrile, hydrocyanic acid, acetonitrile, ammonia, nitrogen and in some cases acrolein, if desired after preliminary purification, for example with one of the solvents enumerated above, is supplied to the bottom of a column 1 (FIGURE 1), while pure solvent, if desired having a small content of water, is supplied to the top of the column 1. The ratio of solvent to gas mixture supplied is about 0.1 to 100, advantageously 0.2 to 20, liters per cubic meter (S.T.P.). The temperature of the column 1 is preferably kept at about 10° to about 100° C. and the pressure at about 1 to about 3 atmospheres absolute. Propylene, isobutylene, ammonia, nitrogen and other inert gases are withdrawn at the top of column 1 and then advantageously washed with water so that entrained solvent is removed. About 1 part of water is used for 1,000 to 10,000 parts of gas. If the propylene is to be reused, it may be supplied to the synthesis process, if necessary after replenishment of the components required for the synthesis of acrylonitrile or methacrylonitrile. The solution obtained at the bottom of the column 1 is supplied to the top of a second column 2. The gas mixture obtained at the top of column 2 is supplied to the bottom of column 1. The column 2 is kept at a temperature of about 15° to about 120° C. and a pressure of 1 to 4 atmospheres absolute. At the bottom of the column 2, a current of gas is withdrawn in an amount of about 0.1 to 10% of the current of gas supplied and this is fed to the bottom of a column 3 which is charged with a small amount (0.1 to 5% of the amount used in column 1) of pure solvent. Column 3 is kept at a temperature of about 15° to about 120° C. and a pressure of 1 to 4 atmospheres absolute. The overhead from column 3, consisting mainly of acrolein (provided this is present in the initial gas mixture), is advantageously washed with pure water to free it from solvent vapor, 1 part of water being used for 1,000 to 10,000 parts by volume of acrolein. The aqueous solution thus obtained is returned to column 2 through column 3. The solution at the bottom of colmn 2 is supplied to the top of column 4. At the same time a current of gas is withdrawn from the top of column 4 and supplied to the bottom of column 2. A side current of gas comprising about 1 to 25% of the gas mixture supplied is removed at the lower end of column 4 and washed in side stream column 5 with fresh solvent (about 0.05 to 5% of the amount supplied to column 1) at a temperature of about 20° to about 120° C. and a pressure of about 1 to about 4 atmospheres absolute, the solution obtained being returned to the column 4. The vapor escaping at the top of column 5 is washed with a small amount of liquid acetonitrile to free it from adherent solvent so that a reflux ratio of 3:1 to 1:10 results. The vapor then consists of practically pure acetonitrile. It is advantageous to condense it after it leaves column 5 and to use the portion required for the reflux for washing the vapor in column 5, while the remainder is withdrawn. The solution at the bottom of column 4 is supplied to the top of column 6 from which the gas escaping at the same time is returned to the bottom of column 4. Column 6 is kept at a temperature of about 25° to about 125° C. and a pressure of about 1 to about 5 atmospheres absolute. A side stream is withdrawn at the lower end, comprising about 1 to 30% of the gas mixture supplied, and supplied to a column 7 which is also trickled with pure solvent. The ratio of solvent to side stream in column 6 is about 1 to 10 liters per cubic meter (S.T.P.).

The vapor escaping from the column 7 is advantageously washed, to strip the residues of solvent, with a reflux of pure acrylonitrile which is advantageously condensed from the gas current escaping from column 7, a reflux ratio of 3:1 to 1:10 being used for washing in column 7 and the remaining acrylonitrile being withdrawn. It is practically completely pure. The solution in the bottom of column 7 is supplied to the bottom of column 6 and the solution in the bottom of column 6 is passed to a stripping column 8. The liquid at the bottom of this column is heated to such an extent that all the components dissolved in the solvent are expelled, i.e., it is as a rule necessary to heat up to the boiling temperature of the solvent; the water content of the solvent may affect the boiling temperature. The gas mixture obtained is returned to the column 6. It is advantageous to withdraw steam together with hydrocyanic acid, possibly together with propionitrile and other organic substances having high solubility in a further side stream at about the middle of the column. To free it from solvent vapor, this stream of gas and vapor is also washed in a column 9 with water, for example with 1 liter per 500 to 5000 liters of gas at a temperature of about 95° C.

All the side streams withdrawn from columns 2, 4, 6 and 8 are saturated with solvent vapor according to their partial pressure. To recover this, these product streams are freed from solvent vapor by washing as described above. The wash liquid used for the purpose is advantageously either water or the product in pure form withdrawn at the point in question. Accordingly water is used for washing in the case of columns 1, 3 and 9, and this may be carried out in a small column having four plates, this column being mounted without appreciable separation directly on the columns 1, 3 and 9. On the other hand the products of columns 5 and 7 is washed in an analogous way with acetonitrile or acrylonitrile. The advantage of this type of purification resides in the fact that the pure products are obtained direct and not azeotropes with water.

If it is desired that two components, for example acetonitrile and acrolein, or acetonitrile and acrylonitrile, should be withdrawn together, the columns in question may be united and the relative proportions of the solvent adapted thereto. It may be advantageous in this case for two substances which have been isolated together, for example acrylonitrile and acetonitrile, to be separated from each other in a further step in accordance with the invention using selective solvents. On the other hand it is obviously possible, by interposing one or more further columns, to separate in pure form additional compounds present in the mixture.

The above sequence of withdrawal of the isolated reaction products holds good when using solvents which have a greater solvent power for acrylonitrile than for acetonitrile, thus for example for N-methylpyrrolidone and the majority of the other N-alkyl substituted heterocycles. Butyrolactone, tetramethylenesulfone and propylene carbonate on the other hand, exhibit a higher solvent power for acetonitrile than for acrylonitrile. Accordingly columns 4, 5 and 6, 7 should be interchanged in their function for these solvents. The solvent power of some solvents for hydrocyanic acid lies between those for acrolein and acrylonitrile. In this case, if the gas mixture contains hydrocyanic acid and it is to be isolated, two appropriate columns for the separation and withdrawal of hydrocyanic acid are interposed between columns 2 and 3 and columns 4 and 5.

The process may however be carried out by other countercurrent methods, for example by means of extractive distillation, liquid-liquid extraction or countercurrent distribution using auxiliary liquids having little polarity, for example isooctane or light naphtha.

The process will now be described with reference to FIGURE 2 by way of example by the method of extractive distillation. A gas mixture, consisting for example of acrylonitrile, hydrocyanic acid and also nitrogen, ammonia and propylene, is passed into about the middle of an extractive column 11. The column is operated at a pressure of, for example, 1 to 10 atmospheres gauge. The selective solvent is supplied at the top of the column at a temperature which lies between the solidification point and the boiling point of the solvent, but advantageously at a temperature between about +10° C. and about 100° C., in an amount of about 0.1 to 100 liters, advantageously from about 0.2 to 200 liters of solvent per cubic meter (S.T.P.) of gas mixture; this solvent absorbs acrylonitrile, acetonitrile and hydrocyanic acid selectively from the gas mixture. The remaining components of the gas mixture (nitrogen, ammonia and propylene) are taken overhead. To remove the solvent, entrained in accordance with its partial pressure, this gas mixture is trickled with a small amount of water (1 liter of water to 1,000 to 10,000 liters of gas) in a bubble tray column. The bottom of column 11 is brought to a temperature lying between about 50° and 150° C. The most advantageous temperature depends among other things on the nature of the solvent used, its water content and the working pressure of the column. The hot solvent at the bottom of this column is passed into the upper third of a second extractive column 12. A small amount of fresh solvent (about 0.05 to 5% of the amount added to column 11) is passed into the top of this column 12. Pure acrylonitrile may be withdrawn at the top of column 12. To remove solvent vapor, the effluent vaporous acrylonitrile is washed in a bubble tray column with a small amount of liquid acrylonitrile as a reflux, the acrylonitrile is then condensed, a part thereof used as the said reflux and the remainder withdrawn as pure product. The reflux ratio is about 3:1 to 1:10. Hydrocyanic acid mixed with water vapor is withdrawn through a side outlet on the column 12 located in about the lower third. To avoid loss of solvent, this stream of product is advantageously washed with a small amount of water (1 liter of water to about 500 to 5000 liters of gas). The solvent in the bottoms is freed from all dissolved substances by heating to the boiling point, which if desired may be lowered by adding water, and may be used again for the separation process after it has been cooled.

If the gas mixture to be processed contains for example acetonitrile, which is to be isolated separately, a third extractive column 13 is interposed between the said columns 11 and 12. Solvent flowing away from the column 11 is supplied to column 13 at about the middle, and a small amount of fresh solvent (about 0.05 to 5% of the amount supplied to the column 11) is supplied at the top of column 13. The bottom of column 13 is brought to a temperature which lies between the temperatures of the bottoms of the columns 11 and 12. Acetonitrile withdrawn from the top of column 13 is washed (in the way described for acetonitrile in column 12) with a small amount of liquid acetonitrile to remove traces of solvent. Other compounds present in the mixture may be isolated if necessary by installing a further number of columns.

An advantage of the process according to this invention is that polymerization products of acrylonitrile, methacrylonitrile or acrolein do not cause any disturbance because they remain dissolved in the solvent. If they build up, it is advantageous to withdraw a bleed stream of solvent, prior to reuse, and to regenerate the same, for example by distillation.

The invention is further illustrated by the following examples, given with reference to FIGURE 1.

EXAMPLE 1

A gas mixture of 92.8 vol. percent of nitrogen, 1.0 vol. percent ammonia, 5.0 vol. percent acrylonitrile, 0.5 vol. percent acetonitrile, 0.5 vol. percent hydrocyanic acid and 0.2 vol. percent acrolein is passed at the rate of 20 cubic meters per hour into the bottom of an extractive column 1 having a diameter of 15 cm. and a height of 10 m. which is provided with bubble trays. 40 liters per hour of N-methylpyrrolidone at a temperature of about 25° C. is supplied to the top of the column. A mixture containing practically only the inorganic components of the gas mixture supplied and in which the organic components are present only in amounts of less than 0.1%, is taken overhead. This gas current is washed with 2 liters per hour of water to recover solvent. The solvent obtained as the bottoms product is passed to the top of a second column 2 having the same dimensions as column 1. The gas mixture (2 cubic meters (S.T.P.) per hour) obtained at the top of column 2 is returned to the bottom of column 1. At the lower end of column 2, a gas current is withdrawn by a side outlet and passed through a small scrubber 3 having a diameter of 5 cm. and a height of 5 m. through which trickles about 0.1 liter per hour of fresh solvent. The whole of the acrolein (with a purity of 98%) is taken overhead. To recover small amounts of entrained solvent, the acrolein is washed with 0.01 liter per hour of water. The acetonitrile is recovered by means of a similarly constructed column system 4 and 5 and the acrylonitrile by means of a similarly constructed column system 6 and 7. Columns 4 and 5 have the same dimensions as columns 2 and 3, while columns 6 and 7 have twice the length of columns 2 and 3. The diameter of column 6 is 15 cm. and that of column 7 is 10 cm. 0.2 liter per hour of N-methylpyrrolidone is supplied to column 5 and 2.5 liters per hour to column 7. To hold back the solvent vapor, the acetonitrile and acrylonitrile vapors escaping at the top of columns 5 and 7 are washed with reflux of pure product, i.e., liquid acetonitrile and acrylonitrile. The reflux ratio is 1:1 in column 5 and 2:1 in column 7. The purity of the acetonitrile obtained is about 99%, while the purity of the acrylonitrile exceeds 99.5%. The product, without any further purification, may be used as initial material for the production of high molecular weight substances for the production of fibres. The gas mixture obtained at the top of columns 4 and 6 is passed into the bottom of the preceding columns 2 and 4, the amounts of gas being 6.5 and 9.5 cubic meters (S.T.P.) per hour.

The solvent is finally freed from all dissolved substances by heating and boiling in column 8. The gas mixture obtained at the top at the rate of about 12 cubic meters (S.T.P.) per hour is returned to the bottom of column 6. Through a side outlet from this column, a mixture of hydrocyanic acid (about 0.1 cubic meter (S.T.P.) per hour) and water vapor (about 0.5 cubic meter (S.T.P.) per hour) is withdrawn and washed with 0.2 liter of water per hour.

EXAMPLE 2

In an apparatus such as is diagrammatically shown in FIG. 1, a gas mixture of 84.1 vol. percent nitrogen, 5.2 vol. percent acrylontrile, 0.5 vol. percent acetonitrile, 4.2 vol. percent carbon monoxide, 0.8 vol. percent carbon dioxide and 5.2 vol. percent propylene is fed at the rate of 20 cubic meters per hour to the bottom of an extractive column 1 having a diameter of 15 cm. and a height of 10 m. which is provided with bubble trays. 20 liters per hour of propylene carbonate at a temperature of about 20° C. is fed to the top of column 1. A mixture consisting essentially of nitrogen, carbon monoxide, carbon dioxide and propylene and containing only traces of other organic substances is taken overhead. This gas stream is washed with 2 liters per hour of water to recover solvent. The solvent obtained as the bottoms product is fed to the top of a second column 2 having the same dimensions as column 1. The gas mixture (2 cubic meters (S.T.P.) per hour) obtained at the top of column 2 is returned to the bottom of column 1. At the lower end of column 2, a gas current is withdrawn by a side outlet and passed through column 3 having a diameter of 10 cm. and a height of 20 m. through which trickles about 3 liters per hour of fresh solvent. The whole of the acrylonitrile (with a purity of 99%) is taken overhead. To recover small amounts of entrained solvent, the acrylonitrile is washed with liquid acrylonitrile, the reflux ratio being 2:1. The acetonitrile is recovered by means of the similarly constructed column system 4 and 5. Column 4 has the same dimensions as column 2, while column 5 has a diameter of 5 cm. and a length of 5 meters. Reflux of liquid acetonitrile is fed to column 5, the reflux ratio being 1:1. The purity of the acetonitrile obtained is approximately 95%. The gas mixture obtained at the top of column 4 is fed to the bottom of the preceding column 2, the amount of gas being approximately 5 cubic meters per hour.

The solvent from the bottom of column 4 is supplied through a line (not shown) direct to column 8, where it is freed from all dissolved substances by heating and boiling. The gas mixture obtained at the top at the rate of about 10 cubic meters (S.T.P.) per hour is returned to the bottom of column 4. Through a side outlet from column 8, a mixture of water vapor (0.5 cubic meter (S.T.P.) per hour) and traces of organic compounds is withdrawn via a small bubble cap column 9 and washed with 0.2 liter of water per hour.

EXAMPLE 3

In an apparatus similar to that described in Example 1 and shown diagrammatically in FIG. 1, a gas mixture of 87.0 vol. percent nitrogen, 3.5 vol. percent acrylonitrile, 0.1 vol. percent acetonitrile, 3.2 vol. percent carbon monoxide, 0.8 vol. percent carbon dioxide, 1.2 vol. percent hydrocyanic acid and 4.2 vol. percent propylene is fed at the rate of 20 cubic meters per hour to the bottom of an extractive column 1 having a diameter of 15 cm. and a height of 10 m. which is provided with bubble trays. 60 liters per hour of 3-methyl-tetramethylenesulfone at a temperature of approximately 20° C. is fed to the top of the column. A mixture containing practically only nitrogen, carbon monoxide, carbon dioxide and propylene apart from traces of other organic substances is taken overhead. This gas current is washed with 2 liters per hour of water to recover solvent. The solvent obtained as the bottoms product is fed to the top of the second column 2 having the same dimensions as column 1. The gas mixture (approximately 2 cubic meters (S.T.P.) per hour) is returned to the bottom of column 1. At the lower end of column 2, a gas current is withdrawn by a side outlet and passed through column 3 having a diameter of 5 cm. and a height of 10 m. through which trickles about 0.6 liter per hour of fresh 3-methyltetramethylenesulfone. Hydrocyanic acid having a purity of more than 95% is taken overhead. To recover small amounts of entrained solvent, the gaseous hydrocyanic acid is washed with reflux of liquid hydrocyanic acid, the reflux ratio being 1:1. The acrylonitrile is recovered by means of a similarly constructed column system 4 and 5, while acetonitrile is recovered by means of a similarly constructed column system 6 and 7. Column 4 has the same dimensions as column 2, while column 5 has a diameter of 10 cm. and a length of 20 m. Column 6 is 15 cm. in diameter and 20 m. high, while column 7 is 5 cm. in diameter and 5 m. high. 3 liters per hour of 3-methyl-tetramethylenesulfone is fed to column 5. The purity of the acetonitrile obtained at the top of column 5 is more than 99%, while the purity of the acetonitrile is approximately 95%. To hold back the solvent vapor, the acrylonitrile and acetonitrile vapors escaping at the top of columns 5 and 7 are washed with reflux of pure product, i.e., liquid acrylonitrile and acetonitrile. The reflux ratio is 2:1 in column 5 and 1:1 in column 7.

The solvent is freed from all dissolved substances by heating and boiling in column 8. The gas mixture obtained at the top at the rate of approximately 10 cubic meters (S.T.P.) per hour is returned to the bottom of column 6. Through a side outlet from this column, a mixture of water vapor (0.5 cubic meter (S.T.P.) per hour) and traces of organic substances are withdrawn via bubble cap column 9 and washed with 0.2 liter per hour of water.

EXAMPLE 4

In an apparatus as used in Example 3 and such as is essentially represented diagrammatically in FIG. 1, a gas mixture of 87.1 vol. percent nitrogen, 0.6 vol. percent oxygen, 1.4 vol. percent carbon monoxide, 3.3 vol. percent carbon dioxide, 4.2 vol. percent acrylonitrile, 0.1 vol. percent acetonitrile, 3.1 vol. percent propylene and 0.2 vol. percent acrolein is fed at the rate of 20 cubic meters per hour to the bottom of an extractive column provided with bubble trays, while 30 liters per hour of butyrolactone at a temperature of approximately 20° C. is fed to the top of the column. A mixture containing practically only the inorganic components of the gas mixture supplied and the propylene apart from traces (below 0.1 vol. percent) of the other organic substances is taken overhead. This gas current is washed with 2 liters per hour of water to recover solvent. The solvent obtained as the bottoms product is fed to the top of the second column 2. The gas mixture (approximately 2 cubic meters (S.T.P.) per hour) is returned to the bottom of column 1. At the lower end of column 2, a gas current is withdrawn by a side outlet and passed through a small scrubber 3 through which trickles about 0.2 liter per hour of fresh solvent. The whole of the acrolein (with a purity of about 95%) is taken overhead. To recover small amounts of entrained solvent, the acrolein is washed with 0.02 liter per hour of water. Acrylonitrile and acetonitrile are recovered by means of similarly constructed column systems 4, 5 and 6 and 7. Column 4 has the same dimensions as column 2, while column 5 has a diameter of 10 cm. and a length of 20 m. Column 6 is 15 cm. in diameter and 20 m. long, while column 7 is 5 cm. in diameter and 5 m. long. 8 liters per hour of butyrolactone is fed to column 5. The purity of the acrylonitrile obtained is in excess of 99%, while the purity of the acetonitrile is approximately 95%. Solvent vapor at the top of columns 5 and 7 is held back by washing with liquid overhead product as described in Example 3. The gas mixture obtained at the top of columns 4 and 6 is passed into the bottom of the preceding columns 2 and 4, the amounts of gas being approximately 6 and 8 cubic meters (S.T.P.) per hour.

The solvent is freed from all dissolved substances by heating and boiling in column 8. The gas mixture obtained at the top at the rate of approximately 10 cubic meters (S.T.P.) per hour is returned to the bottom of column 6. Through a side outlet from this column, a mixture of water vapor (0.5 cubic meter (S.T.P.) per hour) and traces of organic substances is withdrawn via bubble cap column 9 and washed with 0.2 liter per hour of water.

EXAMPLE 5

In an apparatus similar to that used in Example 2, a gas mixture of 86.1 vol. percent nitrogen, 0.3 vol. percent oxygen, 2.5 vol. percent carbon monoxide, 0.5 vol. percent carbon dioxide, 5.4 vol. percent acrylonitrile, 5.1 vol. percent propylene and 0.1 vol. percent acrolein is fed at the rate of 20 cubic meters per hour to the bottom of an extractive column 1 which is constructed as a packed column, while 100 liters per hour of N-γ-hydroxyethylpyrrolidone at a temperature of about 50° C. is fed to the top of the column. A mixture containing practically only the inorganic components of the gas mixture supplied and the propylene apart from traces (below 0.1 vol. percent) of the other organic substances is taken overhead. This gas current is washed with 0.5 liter per hour of water to recover solvent. The solvent obtained as the bottoms product is fed to the top of packed column 2. The gas mixture (approximately 2 cubic meters (S.T.P.) per hour) is returned to the bottom of column 1. At the lower end of column 2 a gas current is withdrawn by a side outlet and passed through a small scrubber 3 having a diameter of 5 cm. and a height of 5 m. through which trickles approximately 0.1 liter per hour of fresh solvent at 50° C. The whole of the acrolein (with a purity of approximately 95%) is taken overhead. To recover small amounts of entrained solvent the acrolein is washed with 0.01 liter per hour of water. The acrolein is recovered by means of a similarly constructed column system 4 and 5. Column 4 has a diameter of 15 cm. and a length of 20 m., while column 5 has a diameter of 10 cm. and a length of 10 m. Reflux of liquid acrylonitrile is fed to column 5 at a reflux ratio of 2:1. The purity of the acrylonitrile obtained is in excess of 99%. The gas mixture obtained at the top of column 4 is fed to the bottom of the preceding column 2, the amount of gas being approximately 8 cubic meters (S.T.P.) per hour.

The solvent from the bottom of column 4 is supplied direct to column 8 where it is freed from all dissolved substances by heating and boiling at a pressure of 100 mm. Hg. The gas mixture obtained at the top at the rate of about 10 cubic meters (S.T.P.) per hour is returned ot the bottom of column 4. Through a side outlet from column 8, a mixture of water vapor (0.5 cubic meter (S.T.P.) per hour) and traces of organic compounds is withdrawn via a small bubble cap column (which is also operated at a pressure of 100 mm. Hg) and washed with 0.2 liter of water per hour.

EXAMPLE 6

From a product stream from a large-scale acrylonitrile synthesis which, in addition to inert gases such as water vapor, nitrogen, carbon monoxide, carbon dioxide and oxygen contains propylene, acrylonitrile, acetonitrile, acrolein and lactic nitrile the bulk of the water vapor is removed by cooling, while the bulk of the acrylonitrile, acetonitrile, acrolein and lactic nitrile is recovered by subsequent compression and further cooling. The additional amount of water thus obtained is again separated. The liquid product mixture consisting of 92% acrylonitrile, 2% acetonitrile, 5% acrolein and 1% lactic nitrile is fed for countercurrent distribution to the middle of a pulsed sieve plate column at the rate of 2 liters per hour. The column has a diameter of 10 cm. and a length of 15 m. The sieve plates are 20 cm. apart. At the lower end of the column a pulsator is provided in the usual manner. Its frequency has been adjusted to 50 pulsations per minute and its amplitude to 6 mm. N-methylpyrrolidone containing 2% of water is fed as a selective solvent to the top of the column at the rate of 20 liters per hour, while light naphtha as an auxiliary solvent is fed to the lower end of the column at the rate of 10 liters per hour. The temperature of the column is about 20° C. From the N-methylpyrrolidone withdrawn from the pulse column, acrylonitrile having a purity of more than 99.5% is recovered by distillation. The yield of acrylonitrile is approximately 97%. The light naphtha contains all of the impurities, and after the dissolved substances have been removed may be used again in the separation process in the same way as the N-methylpyrrolidone.

EXAMPLE 7

In an apparatus similar to that used in Example 2, a gas mixture of 87.8 vol. percent nitrogen, 0.5 vol. percent oxygen, 2.1 vol. percent carbon monoxide, 0.1 vol. percent carbon dioxide, 6.1 vol. percent acrylonitrile, 0.2 vol. percent acetonitrile and lactic nitrile and 3.2 vol. percent propylene is fed at the rate of 20 cubic meters per hour to the bottom of an extractive column 1, while 25 liters per hour of dimethylformamide at a temperature of about 20° C. is fed to the top of the column. A mixture containing practically only the inorganic components of the gas mixture supplied and the propylene apart from traces (below 0.1 vol. percent of the other organic substances) is taken overhead. This gas current is washed with 2 liters per hour of water to recover solvent. The solvent obtained as the bottoms product is fed to the top of column 2. The gas mixture obtained at the top of column 2 is returned to the bottom of column 1. At the lower end of column 2 a gas current is withdrawn by a side outlet and passed through a small scrubber 3 having a diameter of 10 cm. and a height of 10 m. through which trickles approximately 3.2 liters per hour of fresh solvent. The whole of the acrylonitrile (with a purity of more than 99%) is taken overhead. To recover small amounts of entrained solvent the vaporous acrylonitrile is washed with reflux of liquid acrylonitrile, the reflux ratio being 2:1. The acrylonitrile/lactic nitrile mixture is recovered by means of a similarly constructed column system 4 and 5. Column 4 has the same dimensions as column 2, while column 5 has a diameter of 5 cm. and a length of 5 m. Reflux of liquid overhead product is fed to column 5, the reflux ratio being 1:1. The purity of the resultant overhead product is approximately 95%. The gas mixture obtained at the top of column 4 is fed to the bottom of the preceding column 2, the amount of gas being approximately 6 m.$^3$ (S.T.P.) per hour.

The solvent from the bottom of column 4 is supplied direct to column 8, where it is freed from all dissolved substances by heating and boiling. The gas mixture obtained at the top at the rate of about 10 cubic meters (S.T.P.) per hour is returned to the bottom of column 4. Through a side outlet from column 8, a mixture of water vapor (0.5 cubic meter (S.T.P.) per hour) and traces of organic compounds is withdrawn via a small bubble cap column 9 and washed with 0.2 liter of water per hour.

We claim:
1. A process for separating acrylonitrile or methacrylonitrile from a gas mixture obtained in the ammonia oxidathan 10% by volume of water which comprises: contacttion of propylene or isobutylene but not containing more ing the said gas mixture countercurrently at a temperature of from 10° to 100° C. with at least one of the solvents butyrolactone, pyrrolidone, N-methylpyrrolidone, N-ethylpyrrolidone, N-isobutylpyrrolidone, N-hydroxyethylpyrrolidone, valerolactone, piperidone, N-methylpiperidone, N-ethylpiperidone, dimethylsulfone, diethylsulfone, tetramethylenesulfone, 3-methyl-tetramethylenesulfone or dimethylsulfoxide and recovering the acrylonitrile or methacrylonitrile from the solution.

2. A process as claimed in claim 1, in which a solvent is used which contains up to 25% by weight of water.

3. A process as claimed in claim 1 in which the solvent is N-methylpyrrolidone.

4. A process as claimed in claim 1 in which the solvent is propylene carbonate.

5. A process as claimed in claim 1 in which the solvent is 3-methyltetramethylene sulfone.

6. A process as claimed in claim 1 in which the solvent is butyrolactone.

7. A process as claimed in claim 1 in which the solvent is dimethyl sulfoxide.

8. A process as claimed in claim 1 in which the solvent is N-β-hydroxyethylpyrrolidone.

References Cited

UNITED STATES PATENTS 2,702,300   2/1955   Feller et al. _____ 260—465

JOSEPH P. BRUST, *Primary Examiner.*